United States Patent
Zhang et al.

(10) Patent No.: US 10,135,278 B2
(45) Date of Patent: *Nov. 20, 2018

(54) CONTROLLER CHARGING ADAPTER AND METHOD FOR CHARGING MOBILE TERMINAL

(71) Applicant: GUANGDONG OPPO MOBILE TELECOMMUNICATIONS CORP., LTD., Dongguan (CN)

(72) Inventors: Jialiang Zhang, Dongguan (CN); Wenqiang Cheng, Dongguan (CN); Fuchun Liao, Dongguan (CN); Liangcai Peng, Dongguan (CN); Kewei Wu, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/596,985

(22) Filed: May 16, 2017

(65) Prior Publication Data

US 2017/0250544 A1    Aug. 31, 2017

Related U.S. Application Data

(63) Continuation of application No. 15/114,952, filed as application No. PCT/CN2014/077150 on May 9, 2014.

(30) Foreign Application Priority Data

Jan. 28, 2014    (CN) .......................... 2014 1 0042717

(51) Int. Cl.
*H02J 7/04*    (2006.01)
*H02J 7/00*    (2006.01)
*H02M 7/04*    (2006.01)

(52) U.S. Cl.
CPC ............ *H02J 7/007* (2013.01); *H02J 7/0045* (2013.01); *H02M 7/04* (2013.01)

(58) Field of Classification Search
CPC ...................................................... H02J 7/007
See application file for complete search history.

(56) References Cited

U.S. PATENT DOCUMENTS 5,684,382 A * 11/1997 Fritz ..................... H01M 10/44
                                                              320/164
8,319,470 B2    11/2012 English et al.
(Continued)

FOREIGN PATENT DOCUMENTS

CN    102208702 A    10/2011
CN    103199582 A    7/2013
(Continued)

OTHER PUBLICATIONS

Translation of the International Search Report and Written Opinion corresponding to International Application No. PCT/CN2014/077150, dated Oct. 27, 2014, 10 pages.
(Continued)

*Primary Examiner* — Richard V Muralidar
(74) *Attorney, Agent, or Firm* — Lathrop Gage LLP (57) ABSTRACT

The present disclosure provides a charging method and a charging system. The charging system includes a charging adapter and a mobile terminal, the charging adapter includes a second controller and an adjusting circuit, and the mobile terminal includes a cell detection circuit and a cell. The cell detection circuit acquires a voltage value of the cell, and sends the voltage value of the cell to the second controller, the second controller searches a threshold range table for a current adjusting instruction matched with a threshold range containing the voltage value of the cell, and sends the current adjusting instruction to the adjusting circuit, and the adjusting circuit performs a current adjustment according to
(Continued)

the current adjusting instruction and outputs a power signal after the current adjustment, in which the threshold range table records threshold ranges and current adjusting instructions having a one-to-one mapping relation with threshold ranges.

6 Claims, 4 Drawing Sheets

(56) References Cited

U.S. PATENT DOCUMENTS

| | | | |
|---|---|---|---|
| 9,287,721 B2* | 3/2016 | Miwa | H02J 7/0004 |
| 2011/0037438 A1 | 2/2011 | Bhardwaj et al. | |
| 2011/0267009 A1 | 11/2011 | Nakatsuji et al. | |
| 2013/0038297 A1 | 2/2013 | Sang et al. | |
| 2016/0344199 A1* | 11/2016 | Zhang | H02J 7/0045 |
| 2016/0352115 A1* | 12/2016 | Zhang | H02J 7/0029 |

FOREIGN PATENT DOCUMENTS

| | | | |
|---|---|---|---|
| CN | 103219762 A | | 7/2013 |
| CN | 103219769 A | | 7/2013 |
| CN | 103236568 | * | 8/2013 |
| CN | 103236568 A | | 8/2013 |
| CN | 103746434 A | | 4/2014 |
| EP | 2187497 A1 | | 5/2010 |

OTHER PUBLICATIONS

Translation of the International Preliminary Report on Patentability corresponding to International Application No. PCT/CN2014/077150, dated Aug. 2, 2016, 9 pages.
Chinese Patent Application No. 201410042717.2 First Office Action, with English translation, dated Jul. 22, 2015, 13 pages.
Chinese Patent Application No. 201410042717.2 First Search dated Jul. 14, 2015, 1 page.
Chinese Patent Application No. 201410042717.2 Notification to Grant Patent Right for Invention, with English translation, dated Feb. 26, 2016, 3 pages.
European Patent Application No. 14881200.1 extended Search and Opinion dated Aug. 17, 2017, 8 pages.
European Patent Application No. 14881200.1, Communication pursuant to Article 94(3) EPC dated Jun. 11, 2018, 6 pages.

* cited by examiner

CONTROLLER CHARGING ADAPTER AND METHOD FOR CHARGING MOBILE TERMINAL

CROSS REFERENCE

This application is a continuation application based on U.S. application Ser. No. 15/114,952, filed on Jul. 28, 2016, which is a U.S. national phase application based on International Application No. PCT/CN2014/077150, which claims priority to Chinese Patent Application No. 201410042717.2, filed on Jan. 28, 2014, the entire contents of which are incorporated herein by reference.

TECHNICAL FIELD

The present disclosure generally relates to mobile terminal field, and more particularly, to a charging method and system.

BACKGROUND

With the progress of the times, the internet and mobile communication network provide massive functions and applications. A user not only can use a mobile terminal to perform conventional applications, such as use a smart phone to answer a call or call somebody up, but also can use the mobile terminal to browse a webpage, transmit a picture or play a game and so on.

With the increasing usage frequency of the mobile terminal, it is required to charge the mobile terminal frequently. Further, with the user's requirement on the charging speed, some mobile terminals do not monitor the charging current and can accept a bigger charging current (for example, the charging current is 2 A). At the same time, there are some charging adapters with which a charging with bigger current can be performed stably. However, although the charging time is reduced to some extents, the constant current charging with bigger current can bring safety risks. For example, the cell and charging circuit in the mobile terminal can be damaged or even a fire is caused due to the continuous charging with bigger current, if the charging adapter is not disconnected from the mobile terminal in time when electric quantity in the cell is full.

DISCLOSURE

An objective of the present disclosure is to provide a charging method and a charging device, so as to solve a problem in the related art that a cell and a charging circuit are easy to be damaged if a charging adapter charges the cell of a mobile terminal with constant, single and larger charging current.

On one hand, a charging method provided in the present disclosure is applied in a charging system including a charging adapter and a mobile terminal. The charging method includes:

with a cell detection circuit, acquiring a voltage value of a cell and sending the voltage value of the cell to a second controller, in which the charging adapter includes the second controller, and the mobile terminal includes the cell detection circuit and the cell;

with the second controller, searching a threshold range table for a current adjusting instruction matched with a threshold range containing the voltage value of the cell and sending the current adjusting instruction to an adjusting circuit, in which the charging adapter includes the adjusting circuit, the threshold range table records one or more threshold ranges and one or more current adjusting instructions having a one-to-one mapping relation with the one or more threshold ranges;

with the adjusting circuit, performing a current adjustment according to the current adjusting instruction and outputting a power signal after the current adjustment;

sending the power signal to a first charging interface of the mobile terminal by the charging adapter through a second charging interface, such that the charging adapter charges the cell of the mobile terminal; wherein a first power line in the first charging interface is coupled to a second power line in the second charging interface, a first ground line in the first charging interface is coupled to a second ground line in the second charging interface, there are P first power lines and Q first ground lines, where P is greater than or equal to 2, and Q is greater than or equal to 2.

On the other hand, a charging system provided in the present disclosure includes a charging adapter and a mobile terminal. The charging adapter includes a second controller and an adjusting circuit. The mobile terminal includes a cell detection circuit and a cell. The mobile terminal further includes a first charging interface, and the charging adapter further includes a second charging interface.

The cell detection circuit is configured to acquire a voltage value of the cell, and to send the voltage value of the cell to the second controller.

The second controller is configured to search a threshold range table for a current adjusting instruction matched with a threshold range containing the voltage value of the cell, and to send the current adjusting instruction to the adjusting circuit, in which the threshold range table records one or more threshold ranges and current adjusting instructions having a mapping relation with the one or more threshold ranges.

The adjusting circuit is configured to perform a current adjustment according to the current adjusting instruction, and to output a power signal after the current adjustment.

The charging adapter is further configured to send the power signal to the first charging interface through the second charging interface, such that the charging adapter charges the cell of the mobile terminal, wherein a first power line in the first charging interface is coupled to a second power line in the second charging interface, a first ground line in the first charging interface is coupled to a second ground line in the second charging interface, there are P first power lines and Q first ground lines, where P is greater than or equal to 2 and Q is greater than or equal to 2.

BRIEF DESCRIPTION OF THE DRAWINGS

In order to make the technical solutions of embodiments of the present invention more clearly, the accompanying drawings used in the description of embodiments of the present invention are briefly described hereunder. Obviously, the described drawings are merely some embodiments of present invention. For persons skilled in the art, other drawings can be obtained based on these drawings without any creative work.

DETAILED DESCRIPTION

To make the objectives, the technical solutions, and the advantages of the present invention clearer, the technical solutions in embodiments of the present invention are hereinafter described clearly and completely with reference to the accompanying drawings in embodiments of the present invention. It should be understood that, the specific embodiments described herein are merely used for explanation, but not used to limit the present disclosure. For illustrating the technical solutions of the present invention, specific embodiments are hereinafter described.

It should be noted that, "first" in "first charging interface", "first power line", "first ground line" and "first controller" is used herein for purposes of description, "second" in "second charging interface", "second power line", "second ground line" and "second controller" is also used herein for purposes of description.

It should be noted that, a charging adapter in embodiments of the present disclosure includes a terminal capable of outputting a power signal to charge a cell (a cell of a mobile terminal), such as a power adapter, a charger, an IPAD and a smart phone.

It should be noted that, when a charging adapter charges a cell of a mobile terminal, an impedance (such as, an internal resistance, a parasitic resistance, and coupling resistance, etc.) besides resistance in the charging circuit would be introduced into a charging loop (including a charging circuit in the mobile terminal and a charging circuit in the charging adapter), the introduced impedance can reduce the charging current for directly charging the cell (for example, the charging current outputted from the charging adapter is 3 A, and the charging current finally flowing into the cell will be 2.4 A when the cell is charged by the charging loop with the introduced impedance). It can be seen that, the introduced impedance can waste electric power, resulting in a huge amount of thermal-power consumption.

Figure 1:
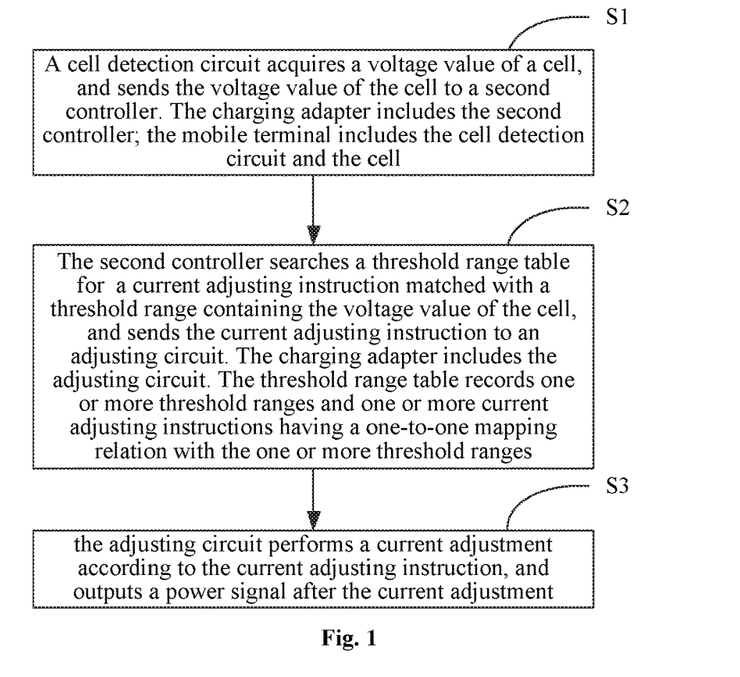
FIG. 1 is a first flow chart showing a charging method provided by an embodiment of the present disclosure.

FIG. 1 is a first flow chart showing a charging method provided by an embodiment of the present disclosure. For illustration purposes, only parts related to embodiments of the present disclosure are shown, which will be described in detail in the following.

The charging method provided by an embodiment of the present disclosure is applied in a charging system including a charging adapter and a mobile terminal. The charging method includes the following steps.

In step S1, a cell detection circuit acquires a voltage value of a cell, and sends the voltage value of the cell to a second controller. The charging adapter includes the second controller; the mobile terminal includes the cell detection circuit and the cell.

In step S2, the second controller searches a threshold range table for a current adjusting instruction matched with a threshold range containing the voltage value of the cell, and sends the current adjusting instruction to an adjusting circuit. The charging adapter includes the adjusting circuit. The threshold range table records one or more threshold ranges and one or more current adjusting instructions having a one-to-one mapping relation with the one or more threshold ranges.

In step S3, the adjusting circuit performs a current adjustment according to the current adjusting instruction, and outputs a power signal after the current adjustment.

Specifically, in this embodiment, when a first charging interface of the mobile terminal is insertion-connected to a second charging interface of the charging adapter, the charging adapter can charge the cell of the mobile terminal. In order to reduce the charging time and to protect the cell and the charging circuit, in normal conditions, the cell can be charged with large current by changing an electric component capable of supporting large current (a charging current which is 3 A or higher than 3 A) or choosing a charging circuit capable of supporting large current (including the charging circuit in the charging adapter (such as, a rectifier and filter circuit and a voltage and current adjusting circuit), and further including a voltage-dropping circuit in the mobile terminal). However, if the cell of the mobile terminal is charged with constant large current, more thermal-power consumption can be generated (i.e., a huge amount of heat can be produced), since an impedance (such as, an internal resistance, a parasitic resistance, and coupling resistance, etc.) besides resistance in the charging circuit would be introduced into the charging loop (including the charging circuit in the mobile terminal and the charging circuit in the charging adapter).

In this embodiment, in order to reduce the thermal-power consumption and to perform an overcharge protection on the cell while it is ensured that a charging can be performed with large current, the cell detection circuit of the charging adapter acquires the voltage value of the cell in real time, and sends the voltage value of the cell to the second controller in real time, such that the second controller adjusts the power signal outputted from the charging adapter in real time.

It should be noted that, a threshold range table is stored in the second controller. The threshold range table can be preset according to a corresponding control requirement to be performed based on the charging time and charging current required for charging the cell. In at least one embodiment, after being edited by a terminal with an edit function, the threshold range table is downloaded to the second controller.

In addition, the threshold range table records one or more threshold ranges, each of which (being a value range) contains an upper limit and a lower limit for the voltage value. Meanwhile, the threshold range table further records one or more current adjusting instructions, in which each current adjusting instruction corresponds to one threshold range. In a specific embodiment of the present disclosure, if the voltage value of the cell detected is in a range of 0V-4.3V, the charging adapter outputs a power signal of 4 A to charge the cell. If the voltage value of the cell detected is in a range of 4.3V-4.32V, the charging adapter outputs a power signal of 3 A to charge the cell. If the voltage value of the cell detected is in a range of 4.32V-4.35V, the charging adapter outputs a power signal of 2 A to charge the cell. If the voltage value of the cell detected exceeds 4.35V, the charging adapter just outputs a power signal of several hundred mA to charge the cell. In this way, the overcharging of the cell is avoided, and also the charging time is reduced. In at least one embodiment, the voltage threshold range consisting of all threshold ranges recorded in the threshold range table is continuous in value. In this way, it can be ensured that a corresponding current adjusting instruction can be found for each voltage value detected (the voltage value of the cell).

Moreover, if the received voltage value of the cell jumps from one threshold range to another threshold range, the second controller can send a current adjusting instruction matched with the other threshold range to the adjusting circuit.

When the current adjusting instruction is received, the adjusting circuit adjusts the power signal outputted from the charging adapter, and a current value of an adjusted power signal is equal to a current value specified by the current adjusting instruction.

In another embodiment of the present disclosure, since an impedance (such as, an internal resistance, a parasitic resistance, and coupling resistance, etc.) besides the resistance in the charging circuit would be introduced into a charging loop (including a charging circuit in the mobile terminal and a charging circuit in the charging adapter), and the introduced impedance can consume a part of charging current (this part of charging current would not flow into the cell of the mobile terminal), it is required to take account of this part of charging current consumed by the introduced impedance, and to make the current value specified by the current adjusting instruction greater than the current value of the power signal entering the cell, so as to ensure that the current value directly flowing into the cell reaches a preset current value. In at least one embodiment, the current value specified by the current adjusting instruction is equal to a sum of the present current value directly flowing into the cell and the current value of the part of charging current consumed by the introduced impedance. For example, if it is expected that the current value of the power signal entering the cell is 3 A and the current value of the part of charging current consumed by the introduced impedance is 0.8 A, the current value specified by the current adjusting instruction (i.e., the current value of the power signal outputted from the charging adapter) is set to 4 A.

Figure 2:
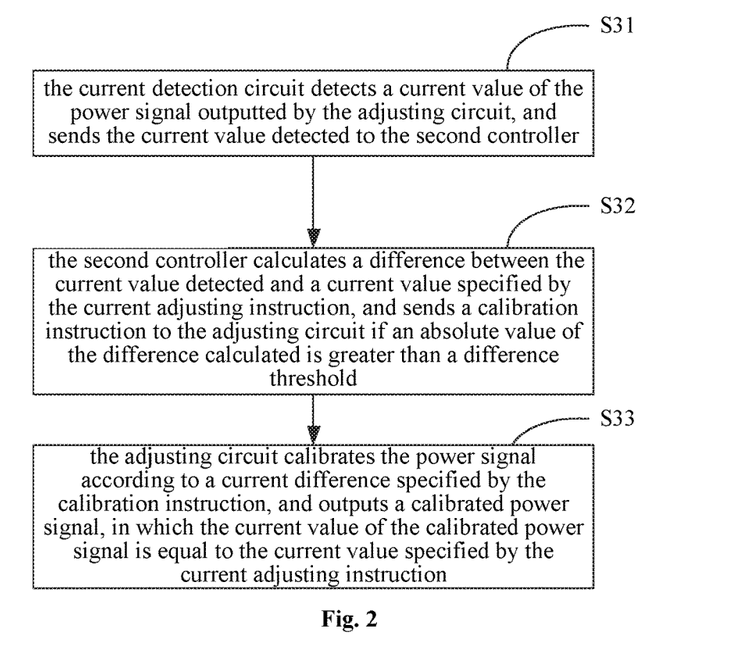
FIG. 2 is a specific flow chart showing step S3 in a charging method provided by an embodiment of the present disclosure.

FIG. 2 is a specific flow chart showing step S3 in a charging method provided by an embodiment of the present disclosure. For illustration purposes, only parts related to embodiments of the present disclosure are shown, which will be described in detail in the following.

In another embodiment of the present disclosure, in order to ensure that the power signal outputted from the adjusting circuit has large current, it is required to monitor in real time whether the current value of the power signal outputted from the charging adapter is equal to the current value specified by the current adjusting instruction. The adjusting circuit includes a current detection circuit.

In this case, performing by the adjusting circuit a current adjustment according to the current adjusting instruction and outputting the power signal after the current adjustment specifically includes the flowing steps.

In step S31, the current detection circuit detects a current value of the power signal outputted by the adjusting circuit, and sends the current value detected to the second controller.

In step S32, the second controller calculates a difference between the current value detected and a current value specified by the current adjusting instruction, and sends a calibration instruction to the adjusting circuit if an absolute value of the difference calculated is greater than a difference threshold.

In step S33, the adjusting circuit calibrates the power signal according to a current difference specified by the calibration instruction, and outputs a calibrated power signal. The current value of the calibrated power signal is equal to the current value specified by the current adjusting instruction.

In this embodiment, the adjusting circuit includes a current detection circuit, and the current value of the power signal outputted by the adjusting circuit (i.e., the current value of the power signal outputted from the charging adapter) is detected by the current detection circuit in real time. In at least one embodiment, the current detection circuit includes a current detecting resistor. The current detecting resistor detects the current value of the power signal outputted by the adjusting circuit in real time and converts the current value into a voltage value, and then sends the voltage value to the second controller, such that the second controller determines the detected current value of the power signal outputted by the adjusting circuit according to the voltage value received and the resistance value of the current detecting resistor.

Then, the second controller calculates a difference between the current value detected and the current value specified by the current adjusting instruction, and calculates an absolute value of the difference, determines whether the absolute value is greater than a difference threshold, and feeds back a calibration instruction to the adjusting circuit if the absolute value is greater than the difference threshold, such that the adjusting circuit adjusts the current value of the power signal outputted in time according to the calibration instruction. It should be noted that, the difference threshold can be pre-adjusted according to the actual operating circumstance of the adjusting circuit.

Then, if the adjusting circuit receives the calibration instruction, it indicates that the difference between the current value of the power signal outputted by the adjusting circuit and the current value specified by the current adjusting instruction is big, and it is required to perform the current adjustment again by the adjusting circuit. Specifically, the current adjustment is performed according to a current difference specified by the calibration instruction, thus ensuring that the current value of the power signal outputted by the adjusting circuit is equal to the current value specified by the current adjusting instruction.

In a specific embodiment of the present disclosure, the adjusting circuit further includes a voltage and current adjusting circuit. The voltage and current adjusting circuit acquires an original power signal by rectifying and filtering the electric supply. In order to calibrate the power signal outputted by the adjusting circuit according to the calibration instruction, the adjusting circuit can determine a voltage adjusting instruction according to the calibration instruction and sends the voltage adjusting instruction determined to the voltage and current adjusting circuit, during a voltage adjustment performed on the voltage of the original power signal. The voltage and current adjusting circuit performs a voltage adjustment according to the voltage adjusting instruction determined and outputs the power signal after the voltage adjustment. Since the power signal after the voltage adjustment would flow through a detecting resistor, the detecting resistor detects whether the current value of the power signal after the voltage adjustment is equal to the current value specified by the current adjusting instruction. If the current value of the power signal flowing through the detecting resistor (the power signal after the voltage adjustment) is equal to the current value specified by the current adjusting instruction, the adjusting circuit stops determining the voltage adjusting instruction according to the calibration instruction received, and stops sending the voltage adjusting instruction determined to the voltage and current adjusting circuit. The voltage and current adjusting circuit stops performing the voltage adjustment.

In this way, in order to ensure in real time that the current value of the power signal outputted by the adjusting circuit is equal to the current value specified by the current adjusting instruction, the detecting resistor performs a real-time detection. If the current is over-high or too small, the current value is fed back to the second controller. The second controller generates the calibration instruction according to the current value fed back, and sends the calibration instruction to the adjusting circuit. The adjusting circuit determines the voltage adjusting instruction according to the calibration instruction and sends the voltage adjusting instruction to the voltage and current adjusting circuit, such that the voltage and current adjusting circuit performs the voltage adjustment according to the voltage adjusting instruction and outputs the power signal after the voltage adjustment. Then, the detecting resistor continues to detect whether the current value of the power signal after the voltage adjustment is equal to the current value specified by the current adjusting instruction.

Figure 3:
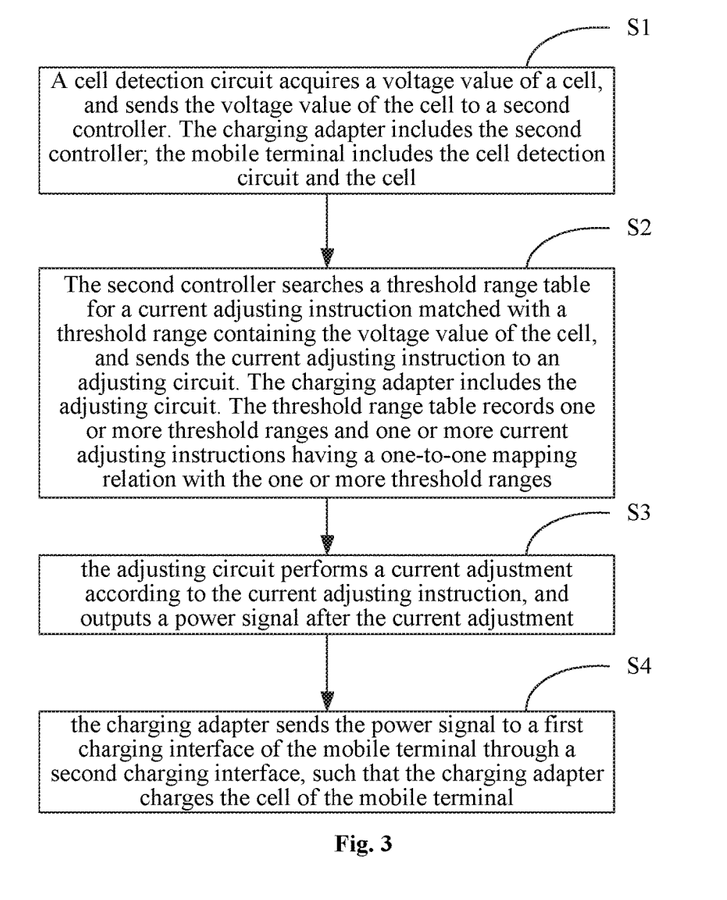
FIG. 3 is a second flow chart showing a charging method provided by an embodiment of the present disclosure.

FIG. 3 is a second flow chart showing a charging method provided by an embodiment of the present disclosure. For illustration purposes, only parts related to embodiments of the present disclosure are shown, which will be described in detail in the following.

In another embodiment of the present disclosure, after the adjusting circuit performs a current adjustment according to the current adjusting instruction and outputs a power signal after the current adjustment, the charging method further includes the following steps.

In step S4, the charging adapter sends the power signal to a first charging interface of the mobile terminal through a second charging interface, such that the charging adapter charges the cell of the mobile terminal. A first power line in the first charging interface is coupled to a second power line in the second charging interface. A first ground line in the first charging interface is coupled to a second ground line in the second charging interface. There are P first power lines and Q first ground lines in the first charging interface, where P is greater than or equal to 2, and Q is greater than or equal to 2.

Specifically, an existing MICRO USB interface (including the MICRO USB plug of the charging adapter and the MICRO USB jack of the mobile terminal) only has one power line and one ground line, such that only one charging loop can be formed by the power line and the ground line, and the charging current is typically several hundred mA, and is typically not higher than 3 A.

Therefore, this embodiment provides a first charging interface capable of supporting a large current charging (charging current which is 3 A or higher than 3 A). Since the first charging interface has at least two first power lines and at least two first ground lines, the mobile terminal can support a charging with large current through the first charging interface.

In addition, if the charging adapter insertion-connected to the first charging interface is an existing charging adapter (such as a charging adapter using the MICRO USB interface to charge), a conventional charging still can be performed (by insertion-connecting the power line and ground line contained in the MICRO USB interface with one first power line and one first ground line in the first charging interface respectively), i.e., the cell is charged by only using the power line and the ground line.

In at least one embodiment, there are P second power lines and Q second ground lines.

The P first power lines in the first charging interface are coupled to the P second power lines in the second charging interface respectively. The Q first ground lines in the first charging interface are coupled to the Q second ground lines in the second charging interface respectively.

In this embodiment, after the first charging interface is insertion-connected to the second charging interface, at least two charging loops (the number of charging loops is the minimum of P and Q) can be formed. Then, the insertion-connected first charging interface and second charging interface can support a charging with large current (a charging current which is 3 A or higher than 3 A). Then, the charging adapter can output a power signal with large current (such as a power signal of 4 A) when the voltage value of the cell is small (for example, the voltage value of the cell is lower than 4.3V), so as to charge the cell of the mobile terminal with large current.

In at least one embodiment, each of the power line and the ground line of the existing MICRO USB interface is made of metal copper foil with conductivity less than 20%. However, each of the first power lines and the first ground lines included in the first charging interface, and the second power lines and the second ground lines included in the second charging interface provided in this embodiment is made of phosphor bronze C7025 with conductivity reaching 50%, such that the charging current can be further increased in the case that the cell of mobile terminal is charged using at least two charging loops (including at least two first power lines, at least two first ground lines, at least two second power lines and at least two second ground lines). In at least one embodiment, each of the first power lines and the first ground lines included in the first charging interface, and the second power lines and the second ground lines included in the second charging interface is made of chromium bronze C18400 with conductivity reaching 70%, which can further increase the charging current.

In another embodiment of the present disclosure, the cell detection circuit includes a cell connector and a first controller. The step of acquiring by the cell detection circuit the voltage value of the cell and sending the voltage value of the cell to the second controller is specifically performed in such a way that the first controller acquires the voltage value of the cell through the cell connector and sends the voltage value of the cell to the second controller.

In this embodiment, the mobile terminal not only has a third controller configured to process application programs (the third controller can be preset in the mobile terminal), but also has a first controller. With the first controller, charging the cell of the mobile terminal can be controlled.

In addition, the cell connector acquires the voltage value of the cell in real time, and sends the voltage value of the cell to the first controller.

In another embodiment of the present disclosure, after the MICRO USB interface existed in the existing charging adapter is insertion-connected to the first charging interface of the mobile terminal, the charging is performed by the charging circuit existed in the mobile terminal. On the basis of the charging circuit existed in the mobile terminal, the mobile terminal of this embodiment is further provided with a switch circuit, such that when the second charging interface is insertion-connected to the first charging interface, not only the charging can be performed by the charging circuit existed in the mobile terminal, but also the switch circuit can be controlled to turn on by the first controller. Thus, when the charging adapter charges the cell with the existing charging current, the cell can be also charged through the switch circuit which is turned on.

The cell connector is further configured to generate an anode contact signal when detecting whether an anode of the cell is contacted, to generate a cathode contact signal when detecting whether a cathode of the cell is contacted, to generate a temperature signal when detecting a temperature of the cell, and to send the anode contact signal, the cathode contact signal and the temperature signal to the first controller. The first controller forwards the anode contact signal, the cathode contact signal and the temperature signal to the third controller.

Then, the third controller determines according to the anode contact signal whether the anode charging contact of the charging circuit of the mobile terminal and the switch circuit well contacts to the anode of the cell, determines according to the cathode contact signal whether the cathode charging contact of the charging circuit of the mobile terminal and the switch circuit well contacts to the cathode of the cell, and determines according to the temperature signal whether the temperature of the cell exceeds a temperature threshold.

Then, the third controller is configured to send a disconnect instruction to the first controller if it is determined according to the anode contact signal that the anode charging contact does not well contact to the anode of the cell, or it is determined according to the cathode contact signal that the cathode charging contact does not well contact to the cathode of the cell, or it is determined according to the temperature signal that the temperature of the cell exceeds a temperature threshold, such that the first controller sends a first disconnect instruction to the switch circuit, and then the switch circuit is turned off, such that the charging adapter stops charging the cell through the switch circuit.

Figure 4:
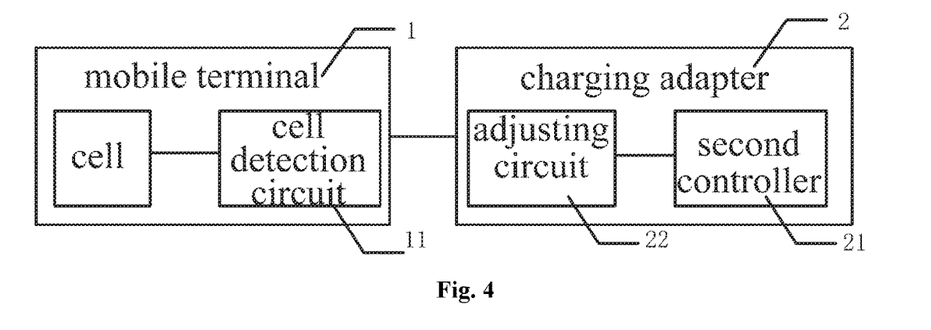
FIG. 4 is a first block diagram showing a charging system provided by an embodiment of the present disclosure.

FIG. 4 is a first block diagram showing a charging system provided by an embodiment of the present disclosure. For illustration purposes, only parts related to embodiments of the present disclosure are shown, which will be described in detail in the following.

It should be noted that, the charging system provided by embodiments of the present disclosure and the charging method provided by embodiments of the present disclosure are adaptable to each other.

The charging system provided by an embodiment of the present disclosure includes: a charging adapter 2 including a second controller 21 and an adjusting circuit 22, and a mobile terminal 1 including a cell detection circuit 11 and a cell.

The cell detection circuit 11 is configured to acquire a voltage value of the cell, and to send the voltage value of the cell to the second controller 21.

The second controller 21 is configured to search a threshold range table for a current adjusting instruction matched with a threshold range containing the voltage value of the cell, and to send the current adjusting instruction to the adjusting circuit 22. The threshold range table records one or more threshold ranges and current adjusting instructions having a mapping relation with the one or more threshold ranges. In at least one embodiment, the threshold range table records one or more current adjusting instructions, and the one or more current adjusting instructions have a one-to-one mapping relation with the one or more threshold ranges.

The adjusting circuit 22 is configured to perform a current adjustment according to the current adjusting instruction, and to output a power signal after the current adjustment.

Figure 5:
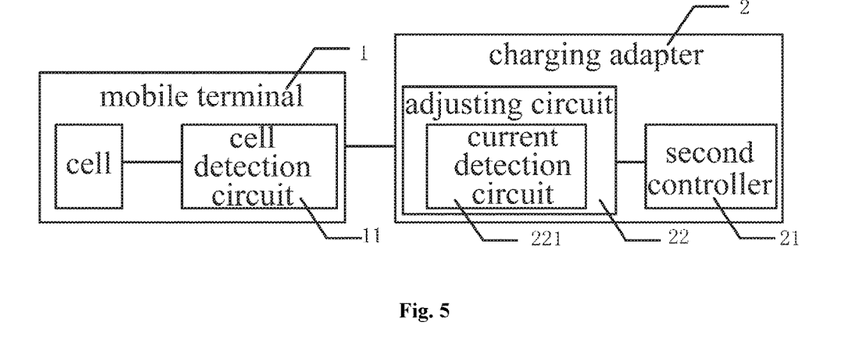
FIG. 5 is a second block diagram showing a charging system provided by an embodiment of the prevent disclosure.

FIG. 5 is a second block diagram showing a charging system provided by an embodiment of the present disclosure. For illustration purposes, only parts related to embodiments of the present disclosure are shown, which will be described in detail in the following.

In another embodiment of the present disclosure, the adjusting circuit 22 includes a current detection circuit 221.

The current detection circuit 221 is configured to detect a current value of the power signal outputted by the adjusting circuit 22, and to send the current value detected to the second controller 21.

The second controller 21 is further configured to calculate a difference between the current value detected and a current value specified by the current adjusting instruction, and to send a calibration instruction to the adjusting circuit 22 if an absolute value of the difference calculated is greater than a difference threshold.

The adjusting circuit 22 is further configured to calibrate the power signal according to a current difference specified by the calibration instruction, and to output a calibrated power signal. A current value of the calibrated power signal is equal to the current value specified by the current adjusting instruction.

Figure 6:
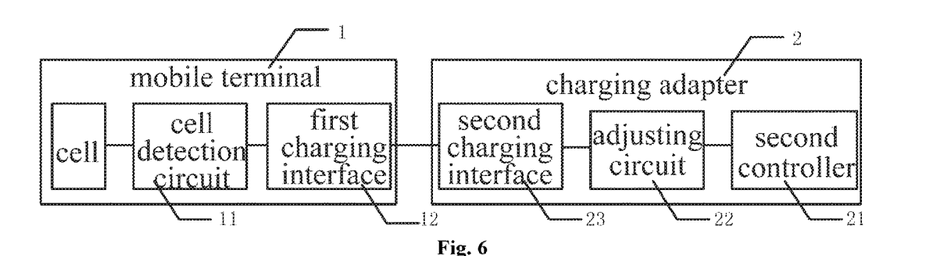
FIG. 6 is a third block diagram showing a charging system provided by an embodiment of the present disclosure.

FIG. 6 is a third block diagram showing a charging system provided by an embodiment of the present disclosure. For illustration purposes, only parts related to embodiments of the present disclosure are shown, which will be described in detail in the following.

In another embodiment of the present disclosure, the charging adapter 2 further includes a second charging interface 23, and the mobile terminal 1 further includes a first charging interface 12.

The charging adapter 2 is further configured to send the power signal to the first charging interface 12 through the second charging interface 23, such that the charging adapter 2 charges the cell of the mobile terminal 1. A first power line in the first charging interface 12 is coupled to a second power line in the second charging interface 23, a first ground line in the first charging interface 12 is coupled to a second ground line in the second charging interface 23. There are P first power lines and Q first ground lines, where P is greater than or equal to 2 and Q is greater than or equal to 2.

In another embodiment of the present disclosure, there are P second power lines and Q second ground lines.

The P first power lines in the first charging interface 12 are connected respectively with the P second power lines in the second charging interface 23, the Q first ground lines in the first charging interface 12 are connected respectively with the Q second ground lines in the second charging interface 23.

Figure 7:
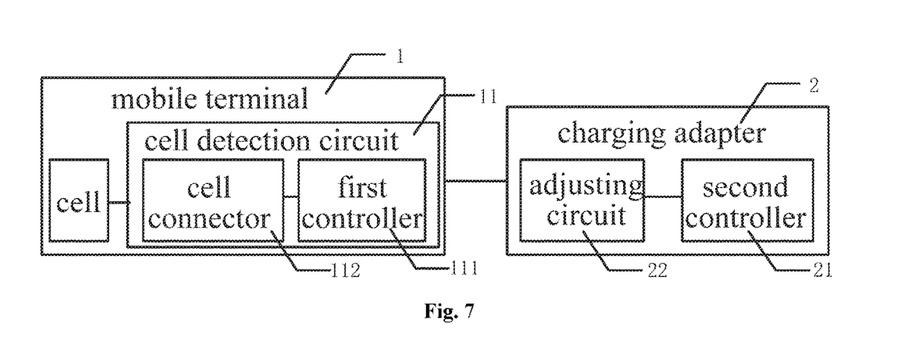
FIG. 7 is a fourth block diagram showing a charging system provided by an embodiment of the present disclosure.

FIG. 7 is a fourth block diagram showing a charging system provided by an embodiment of the present disclosure. For illustration purposes, only parts related to embodiments of the present disclosure are shown, which will be described in detail in the following.

In another embodiment of the present disclosure, the cell detection circuit 11 includes a cell connector 112 and a first controller 111.

The first controller 111 is configured to acquire the voltage value of the cell through the cell connector 112, and send the voltage value of the cell to the second controller 21.

Figure 8:
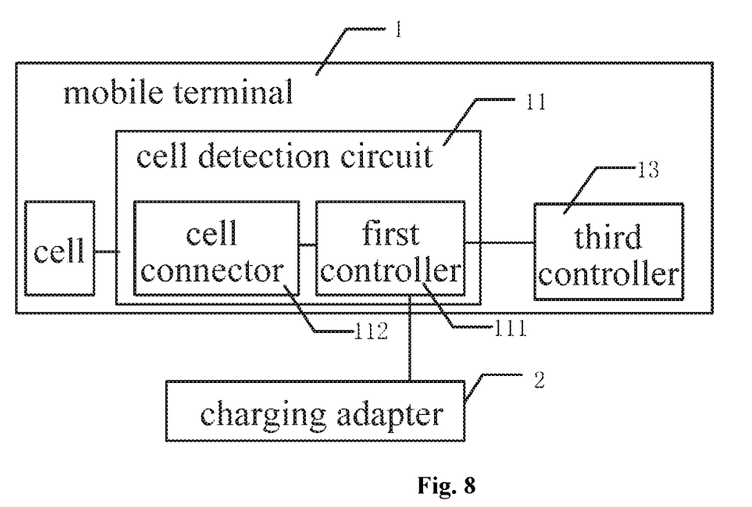
FIG. 8 is a fifth block diagram showing a charging system provided by an embodiment of the present disclosure.

FIG. 8 is a fifth block diagram showing a charging system provided by an embodiment of the present disclosure. For illustration purposes, only parts related to embodiments of the present disclosure are shown, which will be described in detail in the following.

In another embodiment of the present disclosure, the mobile terminal further includes a third controller 13.

The cell connector 112 is configured to generate an anode contact signal when detecting whether an anode of the cell is contacted, to generate a cathode contact signal when detecting whether a cathode of the cell is contacted, to generate a temperature signal when detecting a temperature of the cell, and to send the anode contact signal, the cathode contact signal and the temperature signal to the first controller 111.

The first controller 111 is configured to forward the anode contact signal, the cathode contact signal and the temperature signal to the third controller 113.

The third controller 113 is configured to determine according to the anode contact signal whether an anode charging contact of the mobile terminal and the switch circuit well contacts to the anode of the cell, to determine according to the cathode contact signal whether a cathode charging contact of the mobile terminal and the switch circuit well contacts to the cathode of the cell, to determine according to the temperature signal whether the temperature of the cell exceeds a temperature threshold, and to send a disconnect instruction to the first controller 111 if it is determined according to the anode contact signal that the anode charging contact does not well contact to the anode of the cell, or it is determined according to the cathode contact signal that the cathode charging contact does not well contact to the cathode of the cell, or it is determined according to the temperature signal that the temperature of the cell exceeds a temperature threshold.

The first controller 111 is further configured to turn off the switch circuit according to the first disconnect instruction, such that the charging adapter 2 stops charging the cell through the switch circuit.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure.

What is claimed is:

1. A charging method, applied in a charging system comprising a charging adapter and a mobile terminal, and comprising:
    with a cell detection circuit, acquiring a voltage value of a cell, and sending the voltage value of the cell to a second controller, wherein the charging adapter comprises the second controller, and the mobile terminal comprises the cell detection circuit and the cell;
    with the second controller, searching a threshold range table to obtain a current adjusting instruction matched with a threshold range containing the voltage value of the cell, and sending the current adjusting instruction to an adjusting circuit, wherein the charging adapter comprises the adjusting circuit, the threshold range table records one or more threshold ranges and one or more current adjusting instructions having a one-to-one mapping relation with the one or more threshold ranges; and the adjusting circuit comprises a current detection circuit;
    with the current detection circuit, detecting a current value of a power signal outputted by the adjusting circuit, and sending the current value detected to the second controller;
    with the second controller, calculating a difference between the current value detected and a current value specified by the current adjusting instruction, and sending a calibration instruction to the adjusting circuit if an absolute value of the difference calculated is greater than a difference threshold;
    with the adjusting circuit, calibrating the power signal according to a current difference specified by the calibration instruction, and outputting a calibrated power signal, wherein a current value of the calibrated power signal is equal to the current value specified by the current adjusting instruction;
    sending the power signal to a first charging interface of the mobile terminal by the charging adapter through a second charging interface, such that the charging adapter charges the cell of the mobile terminal; wherein a first power line in the first charging interface is coupled to a second power line in the second charging interface, a first ground line in the first charging interface is coupled to a second ground line in the second charging interface, there are P first power lines and Q first ground lines, where P is greater than or equal to 2, and Q is greater than or equal to 2.

2. The charging method according to claim 1, wherein there are P second power lines and Q second ground lines;
    the P first power lines in the first charging interface are connected respectively with the P second power lines in the second charging interface, and the Q first ground lines in the first charging interface are connected respectively with the Q second ground lines in the second charging interface.

3. The charging method according to claim 1, wherein the cell detection circuit comprises an cell connector and a first controller; and
    with a cell detection circuit acquiring a voltage value of a cell and sending the voltage value of the cell to a second controller comprises:
    with the first controller, acquiring the voltage value of the cell through the cell connector, and sending the voltage value of the cell to the second controller.

4. A charging system, comprising a charging adapter and a mobile terminal, wherein, the charging adapter comprises a second controller and an adjusting circuit, the mobile terminal comprises a cell detection circuit and a cell;
    the cell detection circuit is configured to acquire a voltage value of the cell, and to send the voltage value of the cell to the second controller;
    the second controller is configured to search a threshold range table for a current adjusting instruction matched with a threshold range containing the voltage value of the cell, and to send the current adjusting instruction to the adjusting circuit, wherein the threshold range table records one or more threshold ranges and current adjusting instructions having a mapping relation with the one or more threshold ranges; and the adjusting circuit comprises a current detection circuit; and
    the current detection circuit is configured to detect a current value of a power signal outputted by the adjusting circuit, and to send the current value detected to the second controller;
    the second controller is further configured to calculate a difference between the current value detected and a current value specified by the current adjusting instruction, and to send a calibration instruction to the adjusting circuit if an absolute value of the difference calculated is greater than a difference threshold;
    the adjusting circuit is further configured to calibrate the power signal according to a current difference specified by the calibration instruction, and to output a calibrated power signal, wherein a current value of the calibrated power signal is equal to the current value specified by the current adjusting instruction;

the mobile terminal further comprises a first charging interface, and the charging adapter further comprises a second charging interface;

the charging adapter is further configured to send the power signal to the first charging interface through the second charging interface, such that the charging adapter charges the cell of the mobile terminal, wherein a first power line in the first charging interface is coupled to a second power line in the second charging interface, a first ground line in the first charging interface is coupled to a second ground line in the second charging interface, there are P first power lines and Q first ground lines, where P is greater than or equal to 2 and Q is greater than or equal to 2.

5. The charging system according to claim 4, wherein, there are P second power lines and Q second ground lines;

the P first power lines in the first charging interface are connected respectively with the P second power lines in the second charging interface, the Q first ground lines in the first charging interface are connected respectively with the Q second ground lines in the second charging interface.

6. The charging system according to claim 4, wherein, the cell detection circuit comprises a cell connector and a first controller, the first controller is configured to acquire the voltage value of the cell through the cell connector, and send the voltage value of the cell to the second controller.

* * * * *